US006515279B1

(12) United States Patent
Baykut

(10) Patent No.: US 6,515,279 B1
(45) Date of Patent: Feb. 4, 2003

(54) DEVICE AND METHOD FOR ALTERNATING OPERATION OF MULTIPLE ION SOURCES

(75) Inventor: Gökhan Baykut, Bremen (DE)

(73) Assignee: Bruker Daltonik GmbH, Bremen (DE)

( * ) Notice: Subject to any disclaimer, the term of this patent is extended or adjusted under 35 U.S.C. 154(b) by 0 days.

(21) Appl. No.: 09/632,833

(22) Filed: Aug. 4, 2000

(30) Foreign Application Priority Data

Aug. 7, 1999 (DE) ........................................ 199 37 439

(51) Int. Cl.[7] .......................... H01S 49/00; B01D 59/44

(52) U.S. Cl. ....................... 250/285; 250/288; 250/287; 250/293; 250/281

(58) Field of Search ................................ 250/288, 287, 250/281, 497.1, 498.1, 507.1, 293, 285

(56) References Cited

U.S. PATENT DOCUMENTS 3,473,020 A 10/1969 Brubaker
5,179,278 A 1/1993 Douglas
5,652,427 A 7/1997 Whitehouse et al.
5,668,370 A 9/1997 Yano et al.
5,825,026 A * 10/1998 Baykut ....................... 250/288

FOREIGN PATENT DOCUMENTS

GB 2 315 592 A 2/1998
GB 2 349 270 A 10/2000

OTHER PUBLICATIONS

Paul Kebarle et al.; From Ions In Solution To Ions In The Gas Phase; The Mechanism of Electrospray Mass Spectrometry; Analytical Chemistry, vol. 65, No. 22, Nov. 15, 1993; pp. 972A–986A.
Eugene J. Zaluzec et al.; Review; Matrix–Assisted Laser Desorption Ionization Mass Spectrometry: Applications in Peptide and Protein Characterization; Protein Expression and Purification 6, (1995); pp. 109–123.
Michael W. Senko et al.; Electrospray Ionization Fourier Transform Ion Cyclotron Resonance at 9.4 T; Rapid Communications in Mass Spectrometry, vol. 10, (1996); pp. 1824–1828.

* cited by examiner

*Primary Examiner*—Jack Berman
*Assistant Examiner*—Kalimah Fernandez

(57) ABSTRACT

The invention relates to a device and a method for the alternating operation of ion sources at mass spectrometers equipped with RF multipole ion guides. Designing at least one of the RF multiple ion guides movable perpendicular to the axis, makes it possible to perform a vacuum-internal source exchange, without having to vent the vacuum system.

30 Claims, 9 Drawing Sheets

DEVICE AND METHOD FOR ALTERNATING OPERATION OF MULTIPLE ION SOURCES

The invention relates to a device and a method for the alternating operation of ion sources at mass spectrometers equipped with RF multipole ion guides. By making at least one of the multipole ion guides movable perpendicular to the axis, a vacuum-internal exchange of sources can be performed without venting the vacuum system.

PRIOR ART

For large biological molecules, which decompose when heated, traditional methods of ionization, such as electron impact ionization, cannot be applied. These species require often a milder method of ionization, using which intact molecular ions can be transferred into the gas phase. There are special ionization methods for this, such as electrospray ionization (ESI) or laser desorption ionization (LDI) or also matrix assisted laser desorption ionization (MALDI).

Multiple ionization methods require multiple ion sources for a mass spectrometer. This applies both to ion transmission mass spectrometers, such as a magnet sector or quadrupole mass spectrometers, and ion trap mass spectrometers. In this case, the ion trap can be a Paul quadrupole RF ion trap or an electromagnetic ion cyclotron resonance trap (ICR trap).

Although ions can also be generated in an ion trap, the generation of ions within the measurement cell of the ion trap spectrometers has the disadvantage, that the sample to be ionized has to be introduced into the ion trap. Therefore, the use of all ionization methods directly inside the ion trap is usually more difficult. These methods are frequently applied at "trap-external" ion sources. Additionally, in case of the Fourier transform ion cyclotron resonance mass spectrometry, the measurements have to be performed in the ultrahigh vacuum conditions such as $10^{-8}$–$10^{-9}$ mbar, in order to achieve the best results (high resolution, high mass accuracy). The application of the above mentioned ionization methods are, however, associated with a considerable pressure increase in the vacuum system, which is not permitted in the vicinity of the ICR trap and is only tolerated in a trap-external ion source region. Therefore, differentially pumped trap-external ion sources are part of the standard equipment in the high performance FTICR spectrometers. In the following, the trap-external ion sources will just be called "external ion sources".

In mass spectrometry ion guides have been used for years in order to transfer ions from one part of the mass spectrometer to another part. For transferring the ions formed in an external ion source, various quadrupole ion guid systems have been introduced in the ICR mass spectrometry.

M. W. Senko, C. L. Hendrickson, L. Pasa-Tolic, J. A. Marto, F. M. White, S. Guan and A. G. Marshall describe in their publication in Rapid Communications in Mass Spectrometry 10 1824–1828 (1996) an ion cyclotron resonance mass spectrometer, where the ions, which are generated in a trap-external ion source, are introduced into the ICR trap using an octopole ion guide.

Multipoles connected in series were described in the U.S. Pat. No. 3,473,020 (1969). This patent describes combined multipoles with at least one curved multipole unit.

Shortly after the commercialization of the electrospray ion sources, it is found out that the ions can be introduced into the vacuum system of the mass spectrometer more efficiently using a small multipole unit placed already in the source housing. Therefore, many electrospray ion sources in the market nowadays use a multipole ion guide inside of their housing (U.S. Pat. No. 5,179,278).

In electrospray ionization (ESI) ions are generated at atmospheric pressure using a high voltage (3–6 kV) between an electrospray needle and a counter electrode. In most of the systems immediately after this the ions are sucked through an electrospray capillary into a vacuum. The counter electrode of the electrospray needle is the metallic cap (or a metal coating) at one end of the electrospray capillary. Directly after the exit end of the electrospray capillary one or two skimmers separate the current pressure stage from the next one. The ions are generated in the ESI source at high pressure (atmospheric pressure) but they are transferred to the mass spectrometer at a low pressure (high vacuum). For this, two or sometimes three pumping stages are usually integrated, whereby the pressure at the last stage of the ESI source is reduced down below $10^{-3}$ mbar. The multipole ion guides in electrospray ion sources are located in this low pressure pumping stage behind the skimmer. The gas stream, which exits the electrospray capillary together with the ions, is "peeled off" by the skimmer, whereby the ions penetrate the hole of the skimmer and fly directly into the multipole ion guide.

An overview article about the mechanism of the electrospray is published by P. Kebarle und L. Tang in "Analytical Chemistry" 65, 972A–986A (1993).

In mass spectrometry laboratories, which work with ICR traps or Paul traps, but also with triple stage quadrupole mass spectrometers, electrospray sources are preferred. The reasons are not only the simple and versatile possibilities of use of an electrospray source including the direct coupling possibility to a liquid chromatograph. From biologically interesting large molecules, such as proteins, electrospray ion sources often generate ions with multiple positive charge or multiple negative charge. The positive ions are usually generated by multiple protonation and the negative ones by loss of protons correspondingly. Consequently, their mass-to-charge ratio (m/z) shifts to much lower mass areas of the mass spectrum, which practically means an extension of the mass range. The mass signals of a 66 times protonated bovine serum albumin (≈66 kDa) appears for example already by m/z≈1000.

On the other hand, in the case of MALDI, multiply charged ions are limited to exceptional cases. Although the MALDI method leads with very low amounts of substance to very good results, it is much more often used with time of flight mass spectrometry—due to its wide mass range - than with ion cyclotron resonance traps or with Paul traps. A MALDI overview article by E. J. Zaluzec, D. A. Gage, J. T. Watson in Protein Expression and Purification 6, 109–123 (1995) reports about the applications of this method for characterization of proteins and peptides.

However, MALDI is also increasingly being used with FTICR mass spectrometers, since these instruments produce results with a mass accuracy unachievable by others. MALDI is also used with RF ion traps.

Ions can be trapped in multipole ion guides, as described in the U.S. Pat. No. 5,179,278 for a multipole ion introduction system however in the case of a linear multipole. On the other hand, the patent DE 196 29 134 describes such a possibility with curved multipole ion guides. For this, apertured end plates are placed at both ends of the ion guide. The ions are reflected back to the middle of the hexapole, if these plates have same sign of charge as the ions to be stored. This way, positive ions are kept in the multipole by using a positive trap voltage. By pulsing the positive voltage down to zero or to small negative values, accumulated ions can be extracted in the corresponding direction.

DISADVANTAGES OF THE PRIOR ART

In the case of mass spectrometers with multiple ion sources appears the problem of changing the source. Nowadays, especially FTICR mass spectrometers are used very often with multipole ion sources. If an ion source of such a versatile mass spectrometer has to be swapped against another one, this is associated with venting of at least a part of the vacuum system of the mass spectrometer. This again costs a certain interruption time.

In the bio-sciences the electrospray source is used primarily. Therefore, mass spectrometers often have an electrospray source, which is constantly in use or on standby. This vacuum-external source is then replaced—as required—by another, for instance a MALDI source or an electron impact source. However, in order to install these vacuum-external sources, the vacuum is interrupted, the vacuum-external ion source (ESI) is removed and the new source is mounted.

A proposal to solve this problem is to carefully arrange the placement of the ion sources and equip the system with moveable curved or angled multipole ion guides (German Patent DE 196 29 134). This proposal describes the possibility of connecting fix-mounted ion sources in parallel, of which only one will be in operation at a time. However, the disadvantage here is the placement of the ion sources, which has to be at precise angles and the corresponding adjustment

OBJECTIVE OF THE INVENTION

The objective of the invention is to find a device for rapidly exchanging multiple external ion sources without interrupting the vacuum in the mass spectrometer, and a method for its operation.

BRIEF DESCRIPTION OF THE INVENTION

The basic idea of the invention is to install two, three or more multipole ion guides in series (multipole sequence) as an ion guide system between a fix-installed ion source and the mass spectrometric analyzer, and make at least one of the multipoles slidable out of its axis, so that another ion source can be inserted in place of this multipole removed by sliding and put into operation.

One of the sources of the mass spectrometer (for example an electrospray source) is located at one end of the multipoles that are placed in series. Consequently, the ions produced in this ion source pass through the entire sequence of the multipole ion guides and transferred this way to the analyzer region of the mass spectrometer. At least one of the movable multipole ion guides can be, however, removed out of the multipole sequence (therefore, out of the axis of this ion transfer system) by sliding off. Additional vacuum-internal but trap-external ion sources, which are movable and are located already in the vacuum system can be slid into the resulting gap to the axis of the ion transfer system and can be put into operation. Ions that are formed in one of these other ion sources will pass now, of course, only through the remaining section of the ion transfer system on their way to the mass spectrometric analyzer.

Using this invention, an ion source exchange in a mass spectrometer can be performed manually or motorized, without having to vent the vacuum system.

The FIGS. 2–9 are only briefly described in the following, since they are thoroughly discussed in the description of favorable embodiments.

Figure 1:
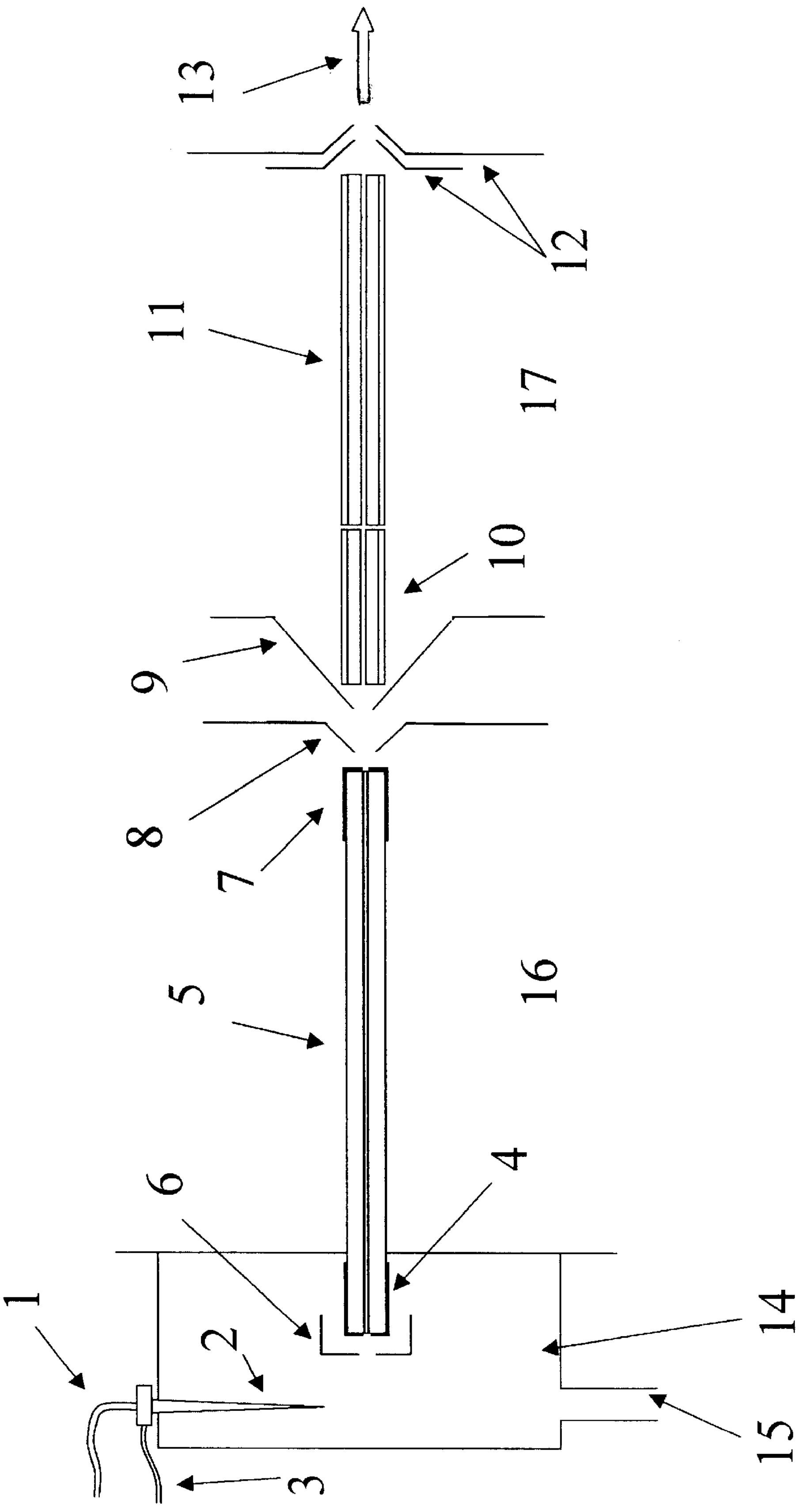
FIG. 1 shows an electrospray source with an orthogonal spraying device. For an efficient description of various embodiments of the invention, it is helpful to explain the construction and the way of operation of a widespread type of electrospray ion source (ESI source). The dissolved sample is fed through a capillary tubing (1) into an electrospray needle (2) or "electrospray nebulizer". The introduction tubing 3 is for the needle gas (usually nitrogen), which leads to a better nebulization. Between the needle (2) and the metal-coated (or metal capped) front end (4) of the electrospray capillary, the electrospray voltage (3–6 kV) is applied. The needle (2) is at the ground potential and the end of the capillary (4) at a negative electrospray voltage, if positive ions are generated. The end plate (6) has a voltage with a magnitude about half a kilovolt less than the end of the electrospray capillary (5). The rear end (7) of the electrospray capillary, which is similarly metal coated, is normally at a very low potential, near ground potential. The electrospray capillary sucks air together with the analyte ions. The ions coming from the electrospray capillary fly through a skimmer (8) into the next vacuum stage of the differentially pumped system. In some ESI sources there is one skimmer, in others there are two skimmers. In the latter case the room between the two skimmers (8 and 9) represents the second pumping stage of the ion source. Ions that fly through these skimmers are transferred with the aid of an RF multipole ion guide. These ion guides consist of linear multipoles. Here are these the octopoles 10 and 11. At the end of the octopole 11 an ion lens or an ion lens pair (12) is placed. In mass spectrometers, which are operated using a pulse sequence, this lens system is used for pulsing the ions stored temporarily in the octopoles into the mass spectrometric analyzer. In some ESI sources, this consists of solely an apertured plate. If a positive potential (e.g. +10 to +20V) is applied to the lenses (12), positive ions cannot leave. They are captured in the multipole. For pulsing these ions out in direction (13) of the mass spectrometric analyzer, a negative voltage pulse is applied to the lens pair (12). The electrospray ionization takes place in the atmospheric pressure in the electrospray chamber (14), which is equipped with an exhaust/drain tube (15). The next vacuum stage (16) of the ESI source has a pressure of approximately 1 mbar and is between the ESI chamber (14) and the first skimmer (8). In the space between the two skimmers (8 and 9) there is a pressure of 0.1 mbar and in the region (17) where the multipole ion guide is placed, there is a pressure of approximately $10^{-3}$ mbar.
Figure 2:
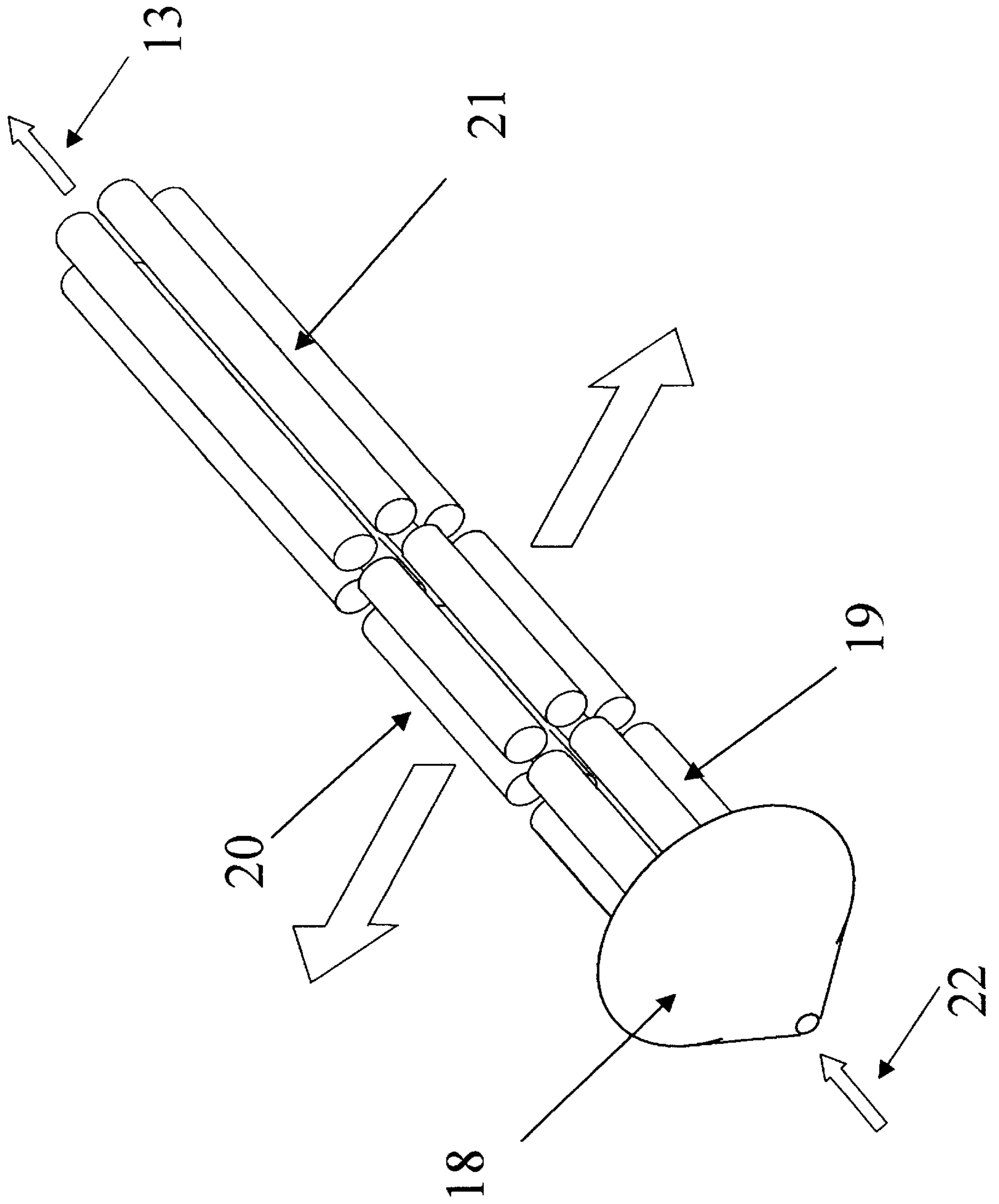

FIG. 2 shows an ion guide system with two hexapoles placed in series including a middle hexapole which is designed to be slidable perpendicular to the axis.

Figure 3:
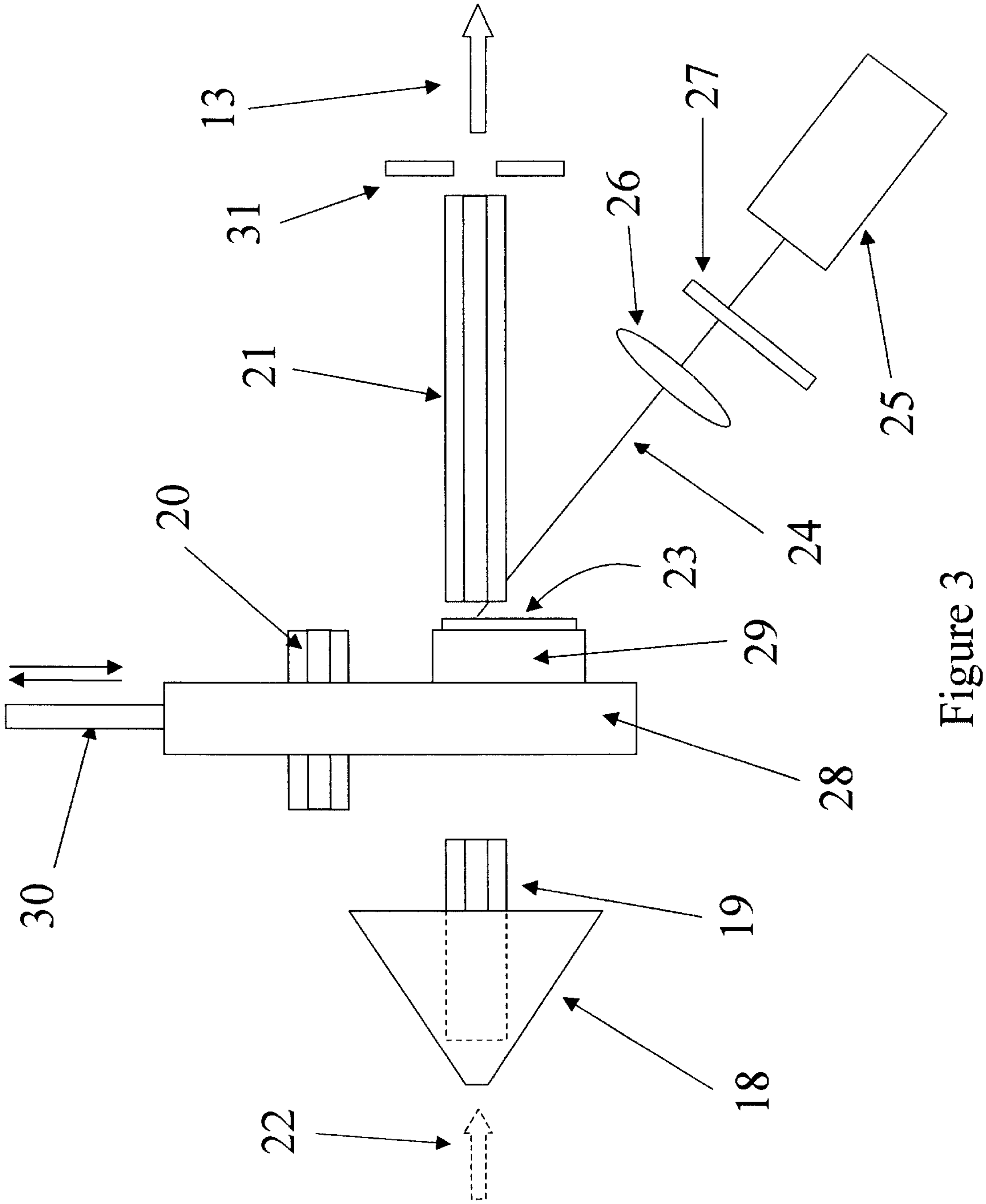

FIG. 3 shows a sliding platform, which allows the exchange of the middle multipole ion guide against a MALDI sample holder by one single sliding motion.

Figure 4:
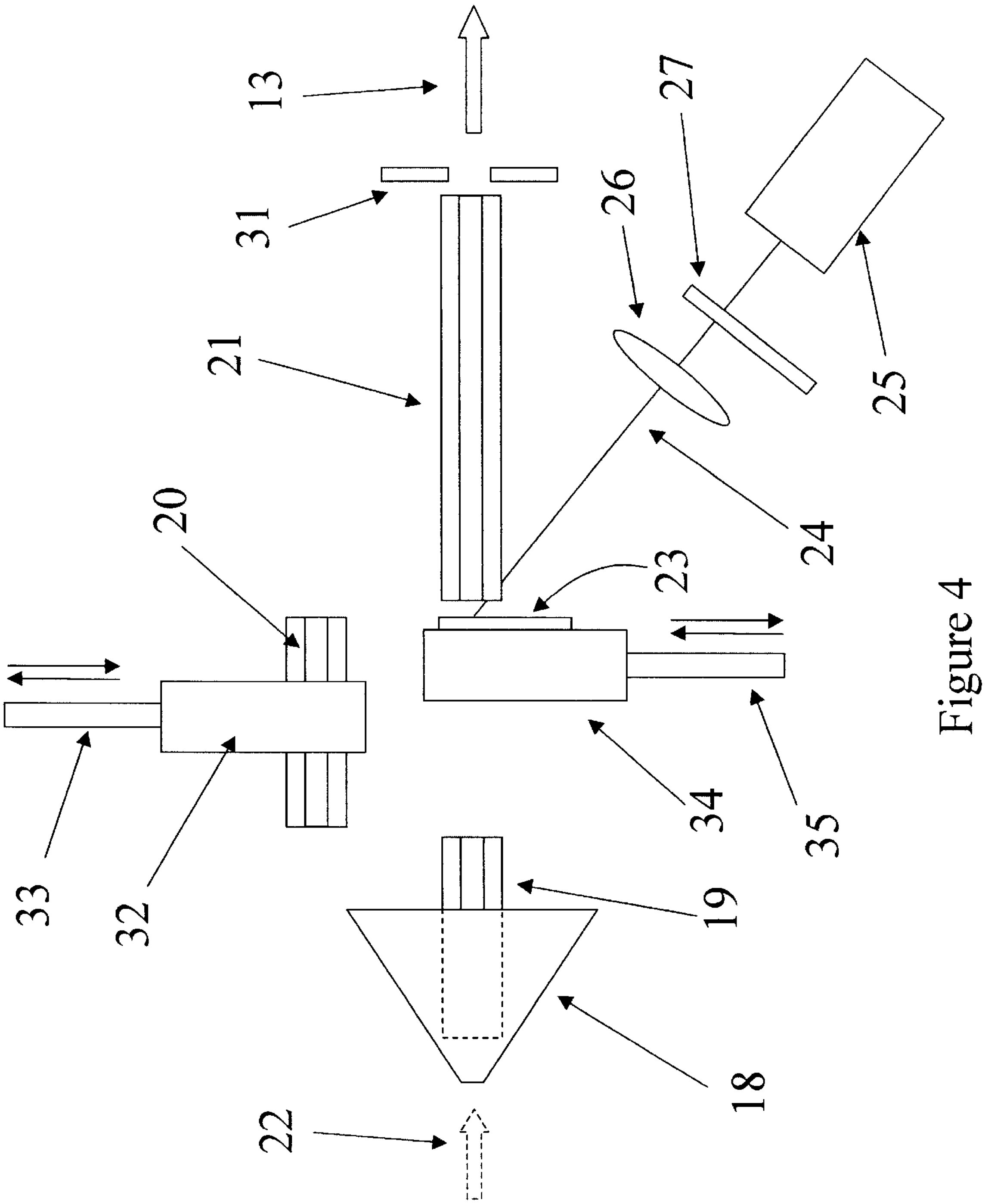

FIG. 4 shows a setup in MALDI configuration, where the hexapole and the MALDI sample carrier are placed on two different platforms.

Figure 5:
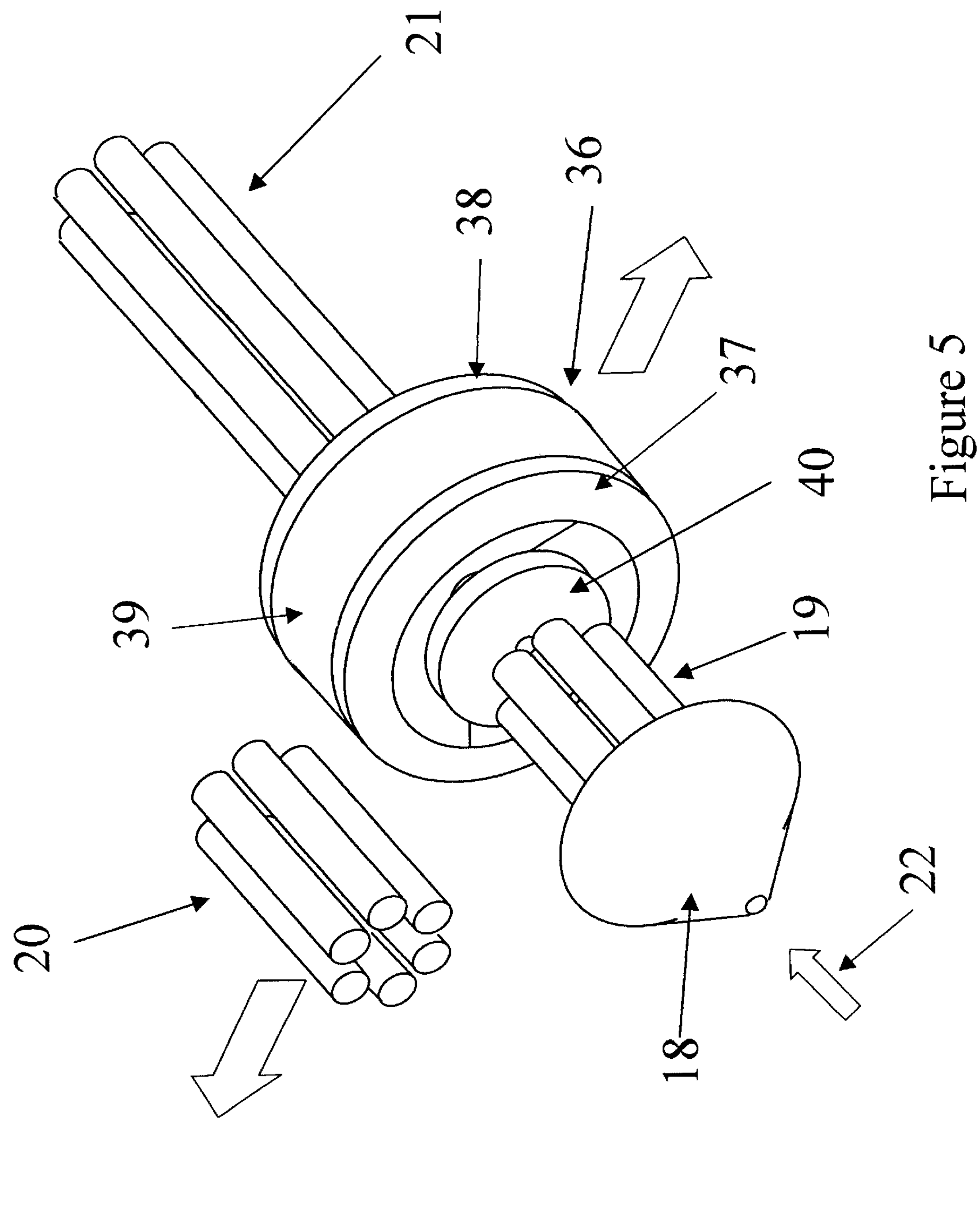

FIG. 5 shows an RF ion trap with an EI source slid between the two multipoles of a triple multipole ion guide system after removing the middle multipole.

Figure 6:
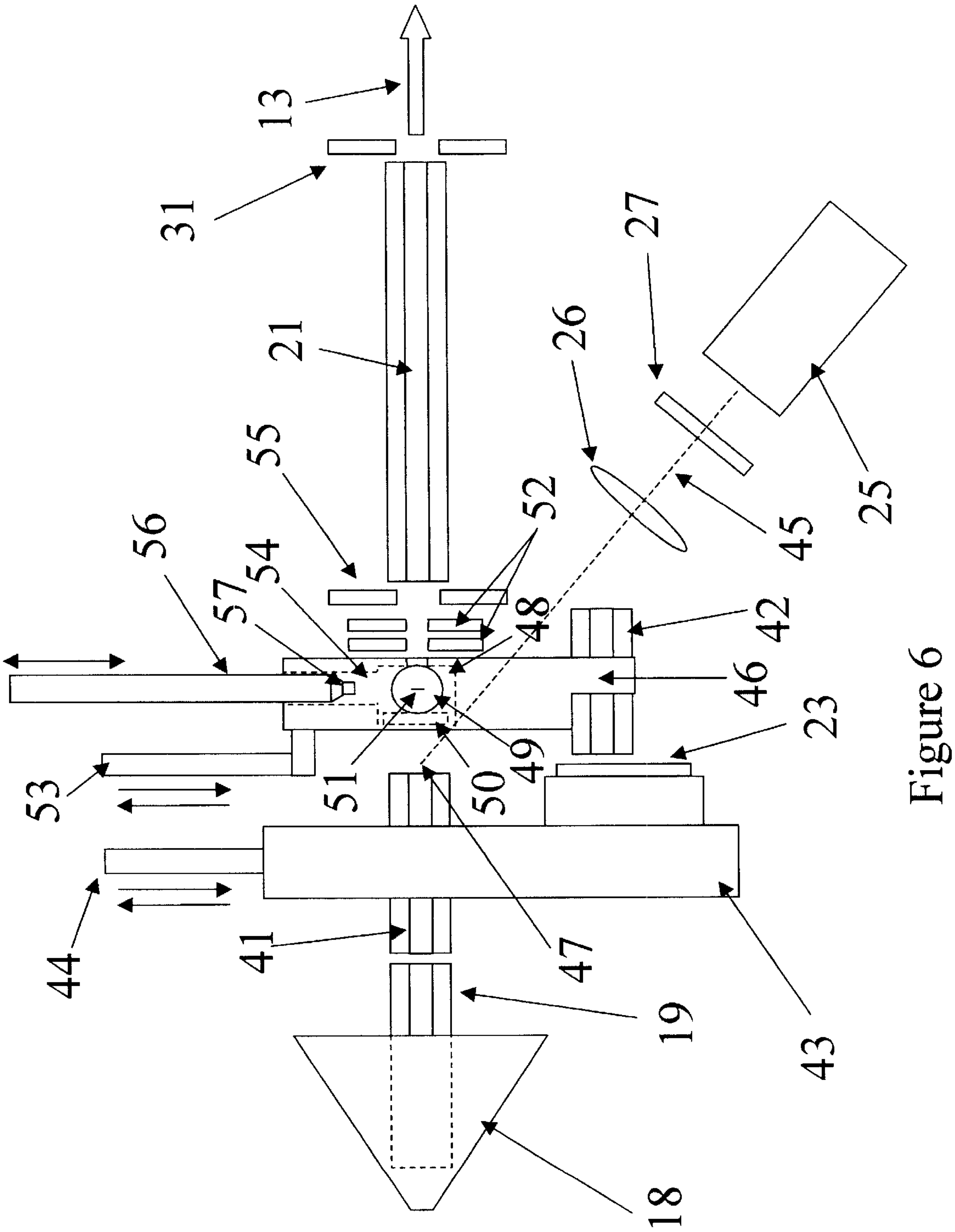

FIG. 6 shows an ion guide system consisting of four multipoles, of which the middle two are slidable. By sliding the second hexapole a MALDI sample carrier, by sliding the third one, an electron ionization source (EI source) can be put into operation.

Figure 7:
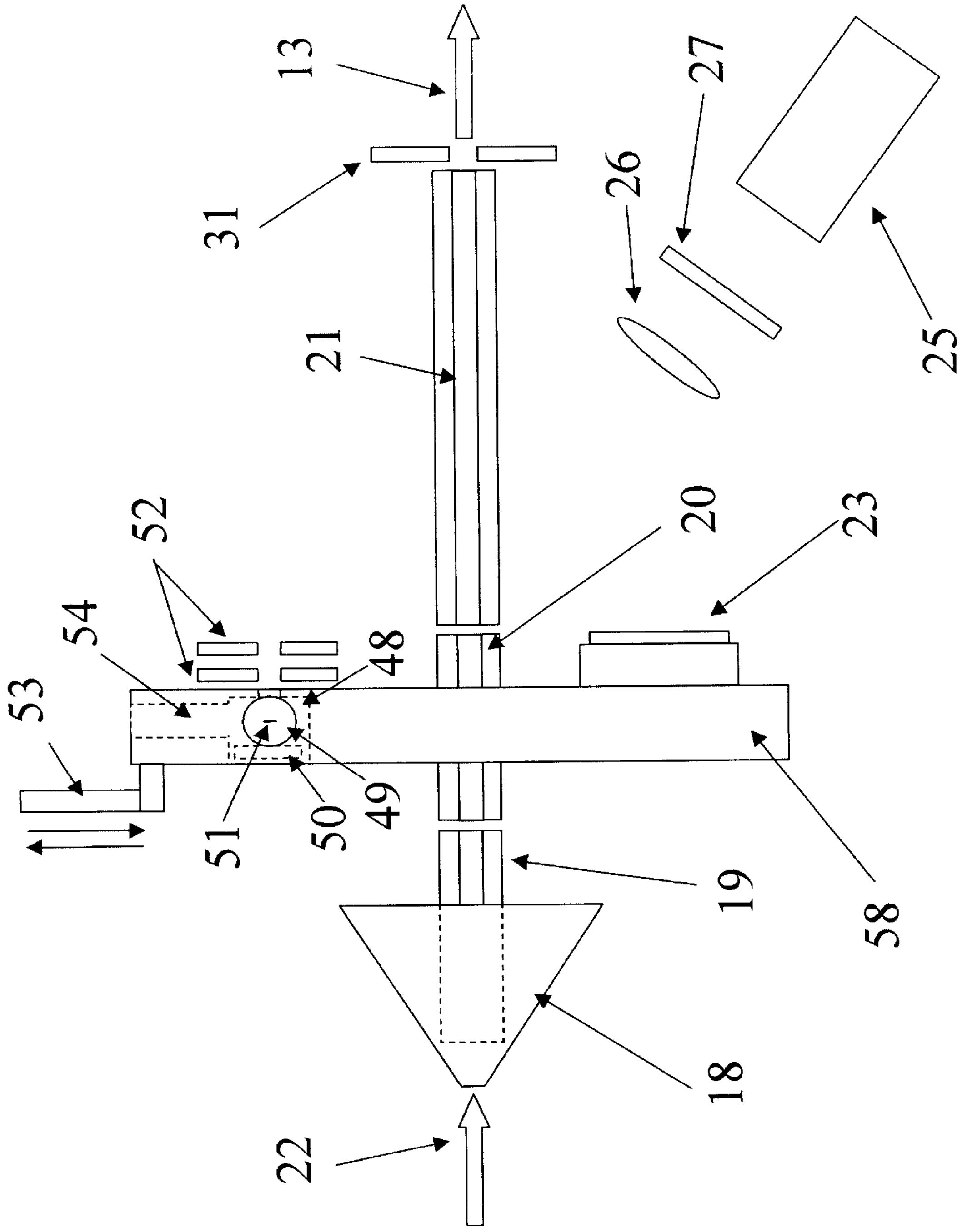

FIG. 7 shows an ion guide system consisting of three multipoles. The slidable platform of the second multipole contains an EI source and a MALDI sample carrier.

Figure 8:
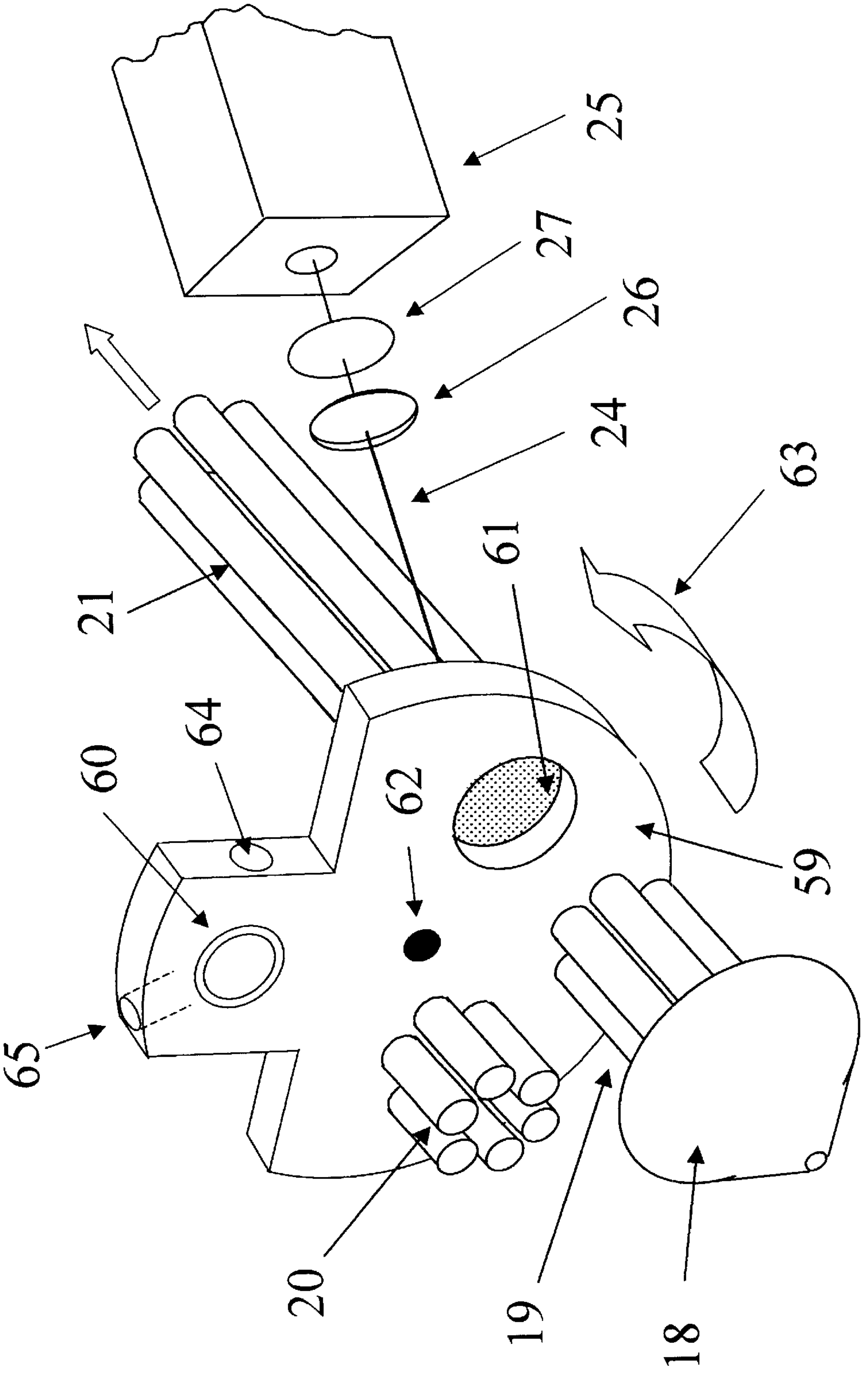

FIG. 8 describes a setup with a rotatable platform, on which an EI source, a MALDI sample carrier and a hexapole are placed. These can be exchanged against each other by rotating the platform.

Figure 9:
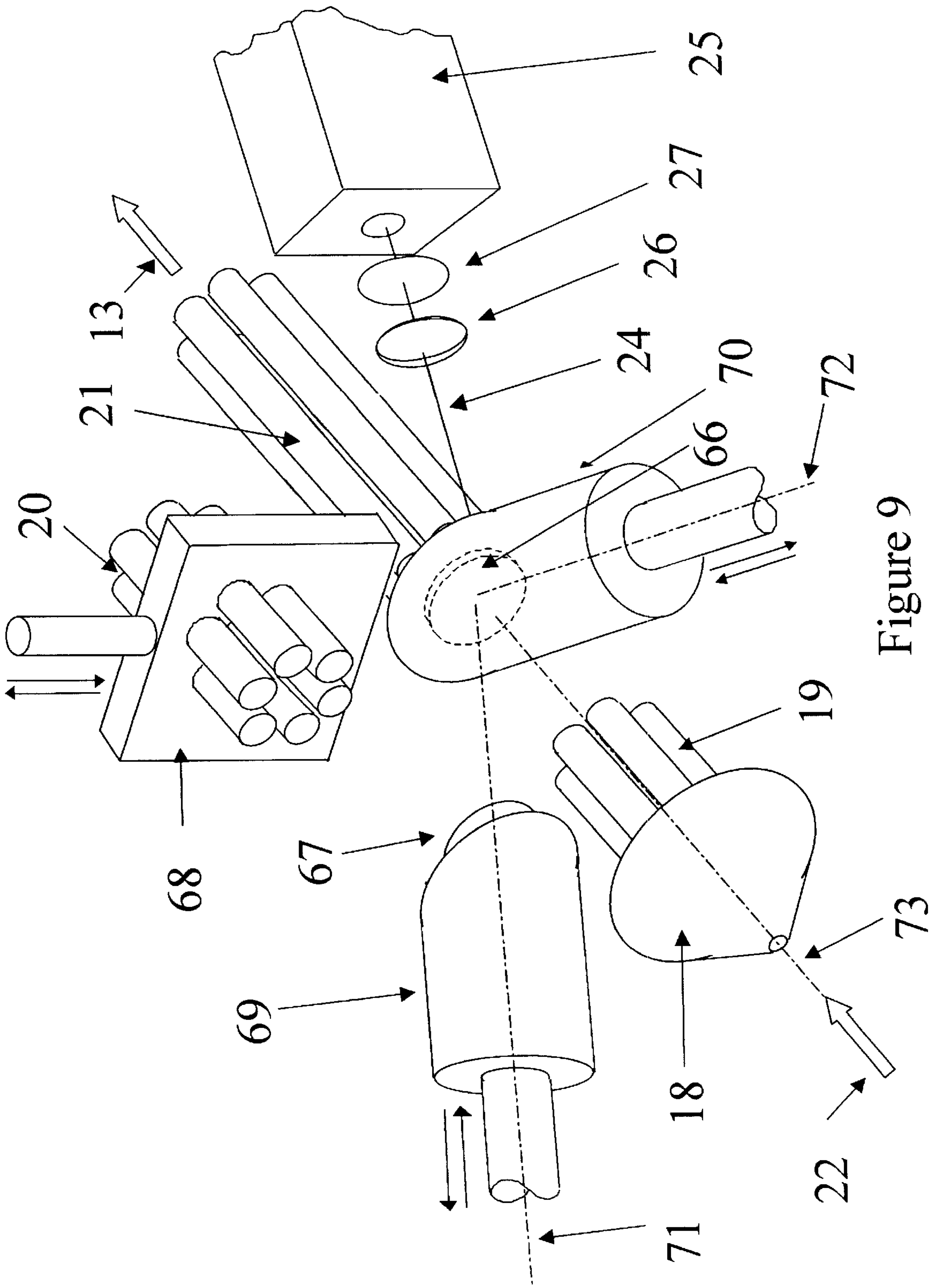

FIG. 9 shows a three multipole system with a slidable second multipole ion guide. A MALDI sample carrier and an EI source can be moved in this setup independent of each other and can be put separately into operation.

SOME FAVORABLE EMBODIMENTS

A system made of three multipoles in series operates as ion guide as good as a system with a single multipole setup, as long as the individual multipoles are close enough to each other. FIG. 2 shows such a system with the hexapoles 19, 20, and 21, which are placed behind a skimmer (18) whereby the middle hexapole (20) is configured to be slidable perpendicular to its axis (arrows) out of the ion guide system in order to allow insertion of another device. Ions (22) which come out of the electrospray capillary fly through the aperture of the skimmer (18) and fly past the multipoles (19,20 and 21) exit at the other end (13) and finally fly to the mass spectrometric analyzer.

FIG. 3 describes a sliding platform (28) with a sample carrier holder (29) and an actuation rod (30). Thus, by a single motion, the hexapole 20 is removed and the sample carrier (23) of the MALDI source is inserted. In this configuration, the system does not allow ions (22) coming from the electrospray source through the skimmer (18) to pass through. Therefore, the ESI source should be turned off during this mode of operation.

An apertured plate (31), which should be connected to a positive voltage for positive ions, ensures that ions can be stored if required. In the MALDI mode of operation, ions are stored between the MALDI sample carrier (23) and this apertured plate (extraction plate) (31). In the electrospray mode of operation ions are stored between the skimmer and the extraction plate. In electrospray operation mode the storage region is the whole transfer line, which consists of all three multipoles. After the storage time, the potential of the extraction plate is changed to negative and the ions fly out of the multipole in the direction of the mass spectrometric analyzer.

FIG. 4 shows a sample carrier (23) mounted on a sliding device (34) slid into the gap that appears between the hexapoles 19 and 21. FIG. 4 shows a setup, whereby the middle hexapole (20) and the laser sample carrier (23) are mounted on two different platforms (32 and 34) and can be moved by the actuator rods (33 or 35) independent of each other. The sample carrier (23) is used for producing ions by laser desorption ionization (LDI) or matrix assisted laser desorption ionization (MALDI). A laser beam (24) of the laser (25) focussed by a lens (26) and attenuated by an attenuator (27) hits the carrier plate (23) and generates ions which fly into the hexapole and then into the mass spectrometric analyzer. In this configuration the ions (22) coming from the electrospray source cannot pass through. The ESI source should remain switched off during this mode of the operation.

In a series of multipole ion guides, one of the ion guides can be replaced by an RF ion trap (Paul trap), by sliding it perpendicular to its axis. The RF ion trap can be equipped with means of generating ions ands it then acts as an ion source. The possibility of ion isolation in a Paul trap before the actual mass spectrometric analysis in a in a further analyzer, makes an attractive option.

FIG. 5 shows a Paul trap (36) slid into the ion transfer line. The sliding device of the second multipole is not shown in this drawing. An electron generator (40) serves to produce an electron beam, which is used to generate the ions.

FIG. 6 shows a system with several movable multipole ion guides placed in series. The two (41 and 42) of the multipole ion guides in the center are movable. The multipole 41 is mounted in a platform (43), which can be shifted with the aid of the rod (44). On the same platform (43) a MALDI sample carrier (23) is placed. The laser beam (45, dashed line), which is not turned on in the illustrated EI mode of operation, hits the inserted sample in the MALDI configuration at the point 47. The EI source is mounted together with the multipole ion guide (42) on the platform 46. Here, 48 is the ionization volume, 49 one of the two guide magnets of the EI source, 50 the repeller, 51 the filament and 52 the ion lenses. The platform 46 can be moved using the rod 53. This moving rod (53) is mounted here at the side of the platform, so that the solids probe rod (56) or a gas/liquid sample probe rode centered in the EI source can be slid into the appropriate aperture (54). The sample in a crucible in front of the heatable tip (57) of the probe rod (56) is slid into the ionization volume (48) through the guide 54. Electrons that are generated by the filament (51) and that move perpendicular to the plane of the paper, collide with molecules and ionize them. Two rod magnets (well known in electron impact sources), which are mounted on an axis perpendicular to the paper plain and of which only one (49) is visible in this drawing, help bundle the electrons by forcing them into tiny cyclotron trajectories.

Ions that are generated in any of the ion sources in this system can be stored in the last hexapole (21), while a source switch is taking place. For this purpose, an extraction plate (31) and an additional apertured plate (55) are placed at opposite ends of the hexapole 21. These two apertured plates are at positive potentials for storing positively charged ions. Thus, electrospray-generated ions are stored in the third hexapole. With the aid of one of the sliding devices, a further ion source is slid to the front and new ions from this source can be mixed with those generated by electrospray. They are then transferred together to the mass spectrometric analyzer.

FIG. 7 describes a setup of three multipole ion guides (19, 20, 21) in series behind the skimmer (18) of the electrospray source, of which the center one (20) is movable and is mounted in a platform (58) together with a MALDI sample carrier (23) and an EI source. By moving the platform (58) correspondingly, one can switch from electrospray mass spectrometry to MALDI mass spectrometry or El mass spectrometry.

On a rotatable platform several ion sources can be mounted, which can be put consecutively into operation by rotating the platform.

FIG. 8 describes a setup, where on a rotatable platform (59) an electron ionization source (60), a MALDI sample carrier (61) and a hexapole (20) are placed. This rotating platform (59) is in principle very similar to the slidable platform (58) from FIG. 9. Here the source switching takes place by rotating (63) the platform (59) around the center (62), as opposed to the sliding operation shown in FIG. 7. One of the rod magnets (64) of the electron source and the guide hole (65) for the probe rod are visible in the drawing. By rotating the platform (59) one of the alternative ion sources can be put into operation, or the hexapole can be moved onto the axis of the other two hexapoles. In the latter case the ions, which are formed in the electrospray source (not shown in the drawing) are transferred into the mass spectrometric analyzer.

FIG. 9 shows a setup where the middle multipole ion guide (20) of a system of three multipoles is removed by a motion perpendicular to the axis, while a MALDI sample carrier (66) or an EI source (67) is slid in and put into operation. The middle hexapole (20) is mounted in a movable frame (68). The EI source as well as the MALDI sample carrier are placed on angled sliding carriers (69 and 70), which can be slid on axes 71 and 72. Both of the carriers can be moved independent of each other, and the sources can be operated one at a time. If the center hexapole is on the axis 73, ions (22) produced in the ESI source (not shown in the figure) at the end are measured in the mass spectrometer.

What is claimed is:

1. Device for alternating operation of multiple ion sources in a mass spectrometer, equipped with a fix-mounted ion source at one end, and an ion transfer line consisting of more than one RF multipole ion guide, wherein with the aid of one or more movement devices, at least one of the multipole guides can be moved from its position relative to the other ion guides and replaced by at least one vacuum internal ion source which then occupies said relative position.

2. Device according to claim 1, wherein one of the RF multipole ion guides is mounted together with one or more other ion sources on a common movement device.

3. Device according to claim 1, wherein the multipole ion guides are arranged serially and each ion guide is mounted to a different movement device.

4. Device according to claim 1, wherein the fix-mounted ion source is mounted vacuum-externally.

5. Device according to claim 4, wherein an electrospray source is used as the vacuum-external source.

6. Method for mass spectrometric determination of ions with the aid of the device according to claim 1, wherein the ions are generated in one or more sources and are accumulated in at least one of the RF ion guides before the transfer into the mass spectrometric analyzer.

7. Method for mass spectrometric determination of ions with the aid of the device according to claim 2, wherein the ions are generated in one or more sources and are accumulated in at least one of the RF ion guides before the transfer into the mass spectrometric analyzer.

8. Method for mass spectrometric determination of ions with the aid of the device according to claim 3, wherein the ions are generated in one or more sources and are accumulated in at least one of the RF ion guides before the transfer into the mass spectrometric analyzer.

9. Method for mass spectrometric determination of ions with the aid of the device according to claim 4, wherein the ions are generated in one or more sources and are accumulated in at least one of the RF ion guides before the transfer into the mass spectrometric analyzer.

10. Method for mass spectrometric determination of ions with the aid of the device according to claim 5, wherein the ions are generated in one or more sources and are accumulated in at least one of the RF ion guides before the transfer into the mass spectrometric analyzer.

11. Apparatus for introducing ions to a mass spectrometer, the apparatus comprising a plurality of ion guides and a plurality of ion sources that may be arranged in each of a plurality of different configurations, each configuration allowing the conducting of ions from a different ion source to the same entry point to the mass spectrometer, wherein at least one of the ion guides and at least one of the ion sources are interchangeable at a single location relative to the remaining ion guides.

12. Apparatus according to claim 11 wherein the ion guides are RF multipole ion guides.

13. Apparatus according to claim 11 wherein a first movable ion guide may be located in a first position in which it conducts ions originating at a first ion source to a second one of the ion guides and, when the first ion guide is moved out of the first position, a movable second ion source may be located in the first position from which it directs ions to the second ion guide.

14. Apparatus according to claim 11 wherein the ion guides are arranged serially such that, in a first configuration, ions from an ion source are conducted sequentially from a first one of the ion guides to a second one of the ion guides before being introduced to the mass spectrometer.

15. Apparatus according to claim 11 wherein at least one of said ion guides may be moved laterally relative to an axis along which ions are conducted.

16. Apparatus according to claim 11 wherein at least one of the ion guides can function as an ion trap, allowing ions to be stored therein.

17. Apparatus according to claim 11 wherein a first one of the ion guides is movable from a first position in which it conducts ions originating at a first ion source, and an RF ion trap may be located in the first position in which it traps ions from the first ion source, and may thereafter be controlled to release the trapped ions.

18. Apparatus according to claim 11 wherein a first one of the ion guides is located on a slidable platform.

19. Apparatus according to claim 11 wherein a first one of the ion guides is located on a rotatable platform.

20. A mass spectrometry apparatus comprising:

a mass spectrometer in which ions are analyzed;

a first ion source that generates ions to be analyzed in the mass spectrometer;

a second ion source that generates ions to be analyzed in the mass spectrometer;

a plurality of ion guides; and a movable structure to which at least one of the ion guides and one of the ion sources are connected, the movable structure being such that, when it is in a first position, ions are conducted from the first ion source to an entry point of the mass spectrometer via a sequential combination of at least two of the ion guides and, when in a second position, ions are conducted from the second ion source to said entry point via at least one of the ion guides.

21. Device according to claim 1 further comprising an ion lens that may be positioned adjacent to at least one of the ion guides.

22. Device according to claim 21 wherein a voltage potential on the ion lens is adjustable to allow control of a release of ions from said one of the ion guides.

23. Device according to claim 21 wherein the ion lens is a first ion lens and wherein the device further comprises a second ion lens located at an end of said one of the ion guides opposite the first ion lens.

24. Device according to claim 21 wherein the ion lens comprises an apertured plate.

25. Device according to claim 21 wherein the ion lens is movable with one of the ion guides.

26. Apparatus according to claim 11 further comprising an ion lens that may be positioned adjacent to at least one of the ion guides.

27. Apparatus according to claim 26 wherein a voltage potential on the ion lens is adjustable to allow control of a release of ions from said one of the ion guides.

28. Apparatus according to claim 26 wherein the ion lens is a first ion lens and wherein the device further comprises a second ion lens located at an end of said one of the ion guides opposite the first ion lens.

29. Apparatus according to claim 26 wherein the ion lens comprises an apertured plate.

30. Apparatus according to claim 26 wherein the ion lens is movable with one of the ion guides.

* * * * *